June 19, 1928.
E. A. RUSSELL ET AL
FLEXIBLE PIPE JOINT
Filed Nov. 30, 1921
1,674,130
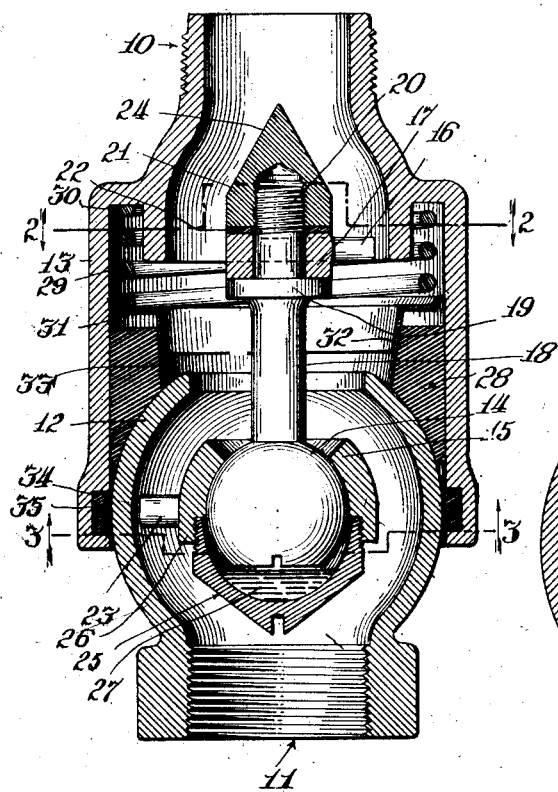

Patented June 19, 1928.

1,674,130

UNITED STATES PATENT OFFICE.

EDWARD A. RUSSELL AND EMIL E. STENZEL, OF CHICAGO, ILLINOIS, ASSIGNORS TO VAPOR CAR HEATING COMPANY, INC., OF CHICAGO, ILLINOIS, A CORPORATION OF NEW YORK.

FLEXIBLE PIPE JOINT.

Application filed November 30, 1921. Serial No. 518,941.

Our invention relates to a universal joint, preferably of the ball-and-socket type, for use in flexibly connecting two conduit members or for forming an element of such connection, the invention having in contemplation particularly a joint which can be utilized in an all-metal flexible tubular connection for coupling together the train pipes of adjacent cars in a railway train.

A primary object of the invention is to provide a universal pipe joint, more particularly of the ball-and-socket type, which will be flexible under high internal pressures, which will be furnished with effective sealing means between the articulated members of the joints, and which will be furnished with means for articulating the members of the joint one with the other, arranged within said members. The latter feature is advantageous because by arranging the articulation of the joint within the conduit members, said means is protected from injury, and the over-all diameter of the joint is reduced to a minimum.

The invention consists in the new and improved arrangements, devices and constructions, to be hereinafter described and claimed, for carrying out the above stated objects, and such other incidental objects as will be referred to in the following description of the preferred embodiment of the invention shown in the accompanying drawing.

In the drawing:

Fig. 1 is a longitudinal sectional view of the joint;

Figs. 2 and 3 are cross-sectional views on lines 2—2 and 3—3, respectively;

Figs. 4 and 5 are views in perspective of devices for reducing the friction of the fluid in passing through the joint; and Fig. 6 is a view in perspective of the ball member constituting part of the means for articulating one conduit member with the other.

Referring to the drawing: 10 and 11 designate the two conduit members of the joint, the latter being formed with a hollow, spherical or ball portion 12, which projects into a socket portion 13 formed on the member 10. The conduit members 10 and 11 are flexibly articulated by means of a ball member 14 rigidly connected with conduit member 10 and a socket member 15 rigidly connected with conduit member 11. This articulation holds the spherical conduit member 12 out of frictional contact with the conduit member 13. The preferred construction for accomplishing this result is as follows: The conduit member 10 is formed interiorly with a spider or equivalent construction 16 having a centrally perforated boss 17 through which projects the extremity of a stem 18 formed on the articulating ball member 14, this stem having a shoulder 19 adapted to bear against the underside of boss 17 and its upper end being threaded, as shown at 20, for a nut 21. A washer 22 is preferably interposed between the nut 21 and boss 17. The ball 14 fits into the socket member 15 which is preferably formed integrally with a spider construction 23 on the interior of the spherical portion 12 of conduit member 11. The nut 21 is preferably formed on the top with a cone 24 and a conical member 25 is secured to an internally threaded flange 26 on the ball member 15, member 25 being formed preferably so as to provide a pocket 27 for a lubricant.

The sealing means between the conduit members 10 and 11 consists preferably of a gasket 28 which is interposed between the inner surface of the socket 13 which is cylindrical and the exterior surface of the inner end of ball 12. This gasket will be kept in proper sealing position by the pressure of the fluid passing through the joint, but to provide for holding the gasket against the spherical member 12 when the joint is not under pressure, a coiled spring 29 is arranged in an annular pocket 30 formed in member 10, so that it will bear against a metallic follower 31, preferably provided with a conical flange 32 extending into and engaging the conical bore 33 of the gasket 28. The spring 29 also serves the function of holding the articulating socket 15 against the ball 14, so that the ball member does not require accurate adjustment with respect to its attachment to spider 16 or take up in case of wear. In order to prevent dust, cinders, and the like from entering the space occupied by the gasket, the socket member 13 is formed near its outer end with an interior channel 34 in which is arranged a packing element 35.

It will be noted that the gasket 28, when urged into the annular space between spherical portion 12 and the cylindrical socket 13, by the spring 29 or the fluid pressure within the joint, will not only seal the joint between these conduit members but will hold the members from contact with one another, thus assisting the articulating ball 14 as a support and centering means for the spherical conduit member.

We claim:

1. A flexible pipe joint comprising in combination conduit members, one having an interiorly cylindrical portion and the other an exteriorly spherical portion extending within but out of contact with the cylindrical portion of the other member, articulating ball and socket elements within and rigidly connected with said conduit members respectively so as to hold one of said members centered within and out of contact with the other member, and a gasket arranged slidably in said cylindrical portion of the one member and having a curved end to fit against the inner part of the spherical portion of said other member.

2. A flexible pipe joint comprising in combination conduit members, one having an interiorly cylindrical portion and the other an exteriorly spherical portion extending within but out of contact with the cylindrical portion of the other member, articulating ball and socket elements within and rigidly connected with said conduit members respectively so as to hold one of said members centered within and out of contact with the other member, a gasket arranged slidably in said cylindrical portion of the one member and having a curved end to fit against the inner part of the spherical portion of said other member, and a spring which tends to keep said ball and socket elements in proper bearing contact with each other.

3. A flexible pipe joint comprising in combination conduit members, one having an interiorly cylindrical portion and the other an exteriorly spherical portion extending within but out of contact with the cylindrical portion of the other member, articulating ball and socket elements within and rigidly connected with said conduit members respectively so as to hold one of said members centered within and out of contact with the other member, a gasket arranged slidably in said cylindrical portion of the one member and having a curved end to fit against the inner part of the spherical portion of said other member, and a spring bearing against said gasket to force the same against the spherical portion of one of said conduit members and to maintain proper bearing contact between said ball and socket elements.

4. A flexible pipe joint comprising in combination conduit members, one having an exteriorly spherical portion extending into but out of contact with the other member, articulating ball and socket elements within and rigidly connected with said conduit members respectively so as to hold one of said members centered within and out of contact with the other member, and a gasket arranged between the inner part of said spherical portion of one of said members and said other member.

5. A flexible pipe joint comprising in combination conduit members, one having an exteriorly spherical portion extending into but out of contact with the other member, articulating ball and socket elements within and rigidly connected with said conduit members respectively so as to hold one of said members centered within and out of contact with the other member, a gasket arranged between the inner part of said spherical portion of one of said members and said other member, and a spring which tends to keep said ball and socket elements in proper bearing contact with each other.

6. A flexible pipe joint comprising in combination conduit members, one having an exteriorly spherical portion extending into but out of frictional contact with the other member, articulating ball and socket elements, the latter formed with a lubricant pocket, within and rigidly connected with said conduit members respectively so as to hold one of said members centered within and out of contact with the other member, and a gasket arranged between the inner part of the spherical portion of one of said members and said other member.

7. A flexible pipe joint comprising in combination conduit members, one having an exteriorly spherical portion extending into but out of contact with the other member, articulating ball and socket elements within and rigidly connected with said conduit members respectively so as to hold one of said members centered within and out of contact with the other member, and a gasket arranged between said spherical portion of one of said members and said other member.

EDWARD A. RUSSELL.
EMIL E. STENZEL.